(No Model.)
S. H. SHORT.
COUPLING FOR THE TROLLEY WIRES OF ELECTRIC RAILWAYS.
No. 445,841. Patented Feb. 3, 1891.
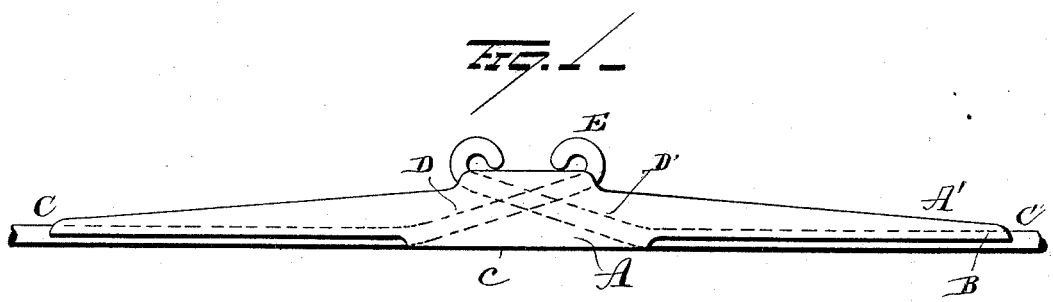
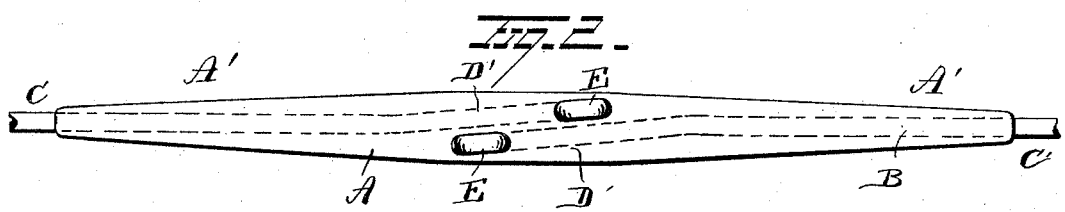
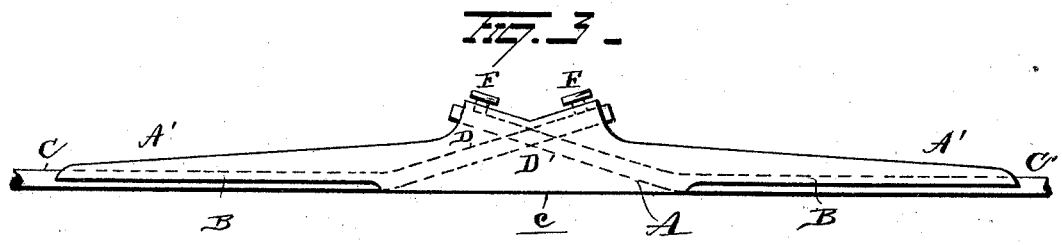
Witnesses
Inventor
Sidney H. Short
By his Attorney
H. A. Seymour

UNITED STATES PATENT OFFICE.

SIDNEY H. SHORT, OF CLEVELAND, OHIO, ASSIGNOR TO THE SHORT ELECTRIC RAILWAY COMPANY, OF SAME PLACE.

COUPLING FOR THE TROLLEY-WIRES OF ELECTRIC RAILWAYS.

SPECIFICATION forming part of Letters Patent No. 445,841, dated February 3, 1891.

Application filed October 29, 1889. Serial No. 328,547. (No model.)

*To all whom it may concern:*

Be it known that I, SIDNEY H. SHORT, of Cleveland, in the county of Cuyahoga and State of Ohio, have invented certain new and useful Improvements in Connectors or Couplings for the Trolley-Wires of Electric Railways; and I do hereby declare the following to be a full, clear, and exact description of the invention, such as will enable others skilled in the art to which it appertains to make and use the same.

My invention relates to an improvement in connectors or couplings for the trolley-wires of electric railways.

The object of the invention is to provide a connector or coupling for connecting together the adjacent ends of a trolley-wire in such a manner that the trolley will be insured a smooth and uninterrupted trackway across the joint, and, further, to secure the ends of the wire to the connector or coupling in such a manner that they will be firmly and securely retained against displacement.

With these ends in view my invention consists in certain features of construction and combinations of parts, as will hereinafter be explained, and pointed out in the claims.

In the accompanying drawings, Figure 1 is a view in side elevation of my improvement. Fig. 2 is a plan view of the same, and Fig. 3 is a modification.

A represents a connector or coupling, preferably made of cast metal and constructed with tapered ends A'. Each arm of the connector is provided on its under side with a groove B for the reception of the two adjacent ends C C' of the trolley-wire. The ends of the trolley-wire pass upwardly through the inclined holes D D', which extend through the connector and in different planes, as is indicated in Fig. 2. A loop or bend E may be formed on each end of the wire to secure it in place, or the ends may be secured by set-screws F, as illustrated in Fig. 3, or they may be fastened in any other desired manner. The lower surfaces of the trolley-wires, together with the straight bearing-surface *c* on the under side of the central portion of the connector, constitute a smooth and uninterrupted bearing-surface for the passage of the trolley. The connection of the two ends of the wire is a most reliable and durable one, the full size of the wire at its ends being preserved, and the fastening comprising an extended frictional surface within the connector and at such an angle of inclination to the direction of the wire or trackway that the ends are firmly held against displacement. Any slack in the wire may be readily taken up by drawing the ends through the holes in the connector and forming a new bend on the projecting ends.

As it is evident that many changes in the form and construction of parts might be resorted to without departing from my invention, I would have it understood that I do not restrict myself to the particular construction shown and described; but, Having fully described my invention, what I claim as new, and desire to secure by Letters Patent, is—

1. A trolley-wire connector or coupling having grooves for the reception of the wires, and inclined holes extending through the coupling, in which the ends of the wires are secured, substantially as set forth.

2. The combination, with the two ends of a trolley-wire, of a connector or coupling having grooves for the reception of the wires, a flat bearing-surface between said grooves, and inclined holes extending from the inner ends of the grooves through the coupling, substantially as set forth.

3. The combination, with the two ends of a trolley-wire, of a connector or coupling provided with tapered ends, each having a groove formed on its under side, a flat bearing-surface between the grooves, and inclined holes extending from the inner ends of the grooves through the coupling, substantially as set forth.

4. The combination, with a connector or coupling having grooves and inclined holes for the reception of the trolley-wires, of the two ends of the trolley-wire, each being secured by a bend or loop formed on its extreme end, substantially as set forth.

In testimony whereof I have signed this specification in the presence of two subscribing witnesses.

SIDNEY H. SHORT.

Witnesses:
J. C. WILLIAMS,
E. H. MORRISON.